US010384518B2

(12) United States Patent
Nishiyama

(10) Patent No.: US 10,384,518 B2
(45) Date of Patent: Aug. 20, 2019

(54) VEHICLE SUN VISOR

(71) Applicant: Yazaki Corporation, Tokyo (JP)

(72) Inventor: Noritaka Nishiyama, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/002,586

(22) Filed: Jun. 7, 2018

(65) Prior Publication Data

US 2018/0361834 A1 Dec. 20, 2018

(30) Foreign Application Priority Data

Jun. 20, 2017 (JP) ................................ 2017-120235

(51) Int. Cl.

| | |
|---|---|
| ***B60J 3/02*** | (2006.01) |
| ***B60Q 3/252*** | (2017.01) |
| ***B60R 16/03*** | (2006.01) |
| *B60R 16/027* | (2006.01) |

(52) U.S. Cl.

CPC .......... *B60J 3/0217* (2013.01); *B60J 3/0221* (2013.01); *B60Q 3/252* (2017.02); *B60R 16/03* (2013.01); *B60R 16/027* (2013.01)

(58) Field of Classification Search

CPC ...... B60J 3/0217; B60J 3/0221; B60J 3/0252; B60R 16/03

USPC ........................................... 296/97.12, 97.13

See application file for complete search history.

(56) References Cited

U.S. PATENT DOCUMENTS

| | | | | |
|---|---|---|---|---|
| 6,139,083 A * | 10/2000 | Fischer | B60J 3/0239 296/97.11 |
| 2002/0094719 A1* | 7/2002 | Sawayanagi | B60J 3/0221 439/545 |
| 2002/0149224 A1* | 10/2002 | Wilson | B60J 3/0217 296/97.5 |
| 2005/0104409 A1* | 5/2005 | Garcia | B60J 3/0221 296/97.9 |
| 2011/0260491 A1 | 10/2011 | Ebisuoka | |
| 2017/0021702 A1* | 1/2017 | Jin | B60J 3/0221 |
| 2018/0361835 A1* | 12/2018 | Kawashima | B60J 3/0217 |
| 2018/0361836 A1* | 12/2018 | Nishiyama | B60J 3/0217 |

(Continued)

FOREIGN PATENT DOCUMENTS

JP 2011-230559 A 11/2011

*Primary Examiner* — Jason S Morrow

(74) *Attorney, Agent, or Firm* — Sughrue Mion, PLLC

(57) ABSTRACT

A vehicle sun visor has a sun visor body including an electrical component, an arm including a cylindrical-end portion on which contact parts of a pair of conductors are arranged and rotatably holding the sun visor body, a mounting bracket for mounting the arm to a vehicle, and a connector attached to the mounting bracket and including a pair of terminals each having a contact portion to contact with a corresponding contact part of the pair of conductors. The mounting bracket includes an arm-supporting portion rotatably supporting a cylindrical-end portion of the arm. The connector is provided with an engaging protrusion. The arm is provided with an annular projection formed on an outer peripheral surface of the cylindrical-end portion exposed outside the arm-supporting portion and configured to engage with the engaging protrusion of the connector. The annular projection has a cutout to guide the engaging protrusion.

2 Claims, 12 Drawing Sheets

(56) References Cited

U.S. PATENT DOCUMENTS

| | | | | |
|---|---|---|---|---|
| 2018/0370341 | A1* | 12/2018 | Shimizu | B60J 3/0217 |
| 2019/0061485 | A1* | 2/2019 | Nishiyama | B60J 3/0217 |

* cited by examiner

VEHICLE SUN VISOR

CROSS REFERENCE TO RELATED APPLICATIONS

This application claims the priority of Japanese Patent Application No. 2017-120235, filed on Jun. 20, 2017, the entire content of which are incorporated herein by reference.

BACKGROUND

Technical Field

The present invention relates to a vehicle sun visor with illumination arranged in the vicinity of an upper end of a front window of a front seat of a vehicle.

Related Art

A vehicle sun visor of this type is disclosed in JP 2011-230559 A. As shown in FIG. 12, the vehicle sun visor 1 includes a non-conductive support shaft (arm) 2 for rotatably holding a sun visor body (not shown), a mounting bracket 5 for mounting the support shaft 2 to a ceiling of a vehicle cabin (not shown), and a connector 7 detachably assembled to the mounting bracket 5 and having a pair of terminals 8 and 8 for supplying electric power.

A pair of conductors 3 and 3 extending in parallel is arranged inside the support shaft 2. Each columnar conductor end portion 3*a* serving as the contact parts of a pair of conductors 3 and 3 is provided on the closed upper surface of an end portion 2*a* toward the mounting bracket 5 so as to protrude outward. The pair of columnar conductor end portions 3*a* and 3*a* is spaced apart from each other, having a space, via a non-conductive intervening portion 2*b* protruding to the center of the upper surface of the end portion 2*a* of the support shaft 2.

The end portion 2*a* of the support shaft 2 is rotatably supported by a cylindrical support protrusion portion 5*a* of the mounting bracket 5, and a housing 7*a* of the connector 7 is assembled to a mounting recess portion 5*b* of the mounting bracket 5.

When the support shaft 2 is rotated to a first position, the pair of columnar conductor end portions 3*a* and 3*a* protruding outward from the end portion 2*a* contacts each spring portion 8*a* of the pair of terminals 8 and 8 for supplying electric power to be brought into an energized (ON) state, whereby a lighting preparation state of the illumination lamp of the sun visor body is formed.

When the support shaft 2 is rotated to the second position, the pair of columnar conductor end portions 3*a* and 3*a* protruding outward from the end portion 2*a* is away from each spring portion 8*a* of the pair of terminals 8 and 8 for supplying electric power to be in a non-conducting (OFF) state.

SUMMARY

However, in the conventional vehicle sun visor 1, when assembling the housing 7*a*. of the connector 7 to the mounting recess portion 5*b* of the mounting bracket 5 to which the support shaft 2 is assembled, the housing 7*a* can be assembled even when the support shaft 2 is arranged at any position. As a result, the columnar conductor end portion 3*a* serving as the contact part protruding outward from the end portion 2*a* of the support shaft 2 and the plate-shaped spring portion 8*a* as the contact part of the terminal 8 assembled to the housing 7*a* of the connector 7 may interfere to each other in some cases. If the connector 7 is forcibly assembled to the mounting bracket 5 in this interference state, the plate-shaped spring portion 8*a* of the terminal 8 may be deformed by the columnar conductor end portion 3*a,* and conduction failure and resistance instability may occur.

The present invention has been made to solve these problems, and it is an object of the present invention to provide a vehicle sun visor in which a connector cannot be assembled to a mounting bracket unless an arm is positioned at a correct assembling position, so that it is possible to reliably prevent a spring portion of a terminal from deforming due to a contact part of a conductor of the arm.

A vehicle sun visor according to an aspect of the present invention has a sun visor body including an electrical component, a non-conductive arm including a cylindrical-end portion on which contact parts of a pair of conductors are arranged and rotatably holding the sun visor body, a mounting bracket configured to mount the non-conductive arm to a vehicle, and a connector detachably attached to the mounting bracket and including a pair of terminals each having a contact portion to contact with a corresponding contact part of the pair of conductors and configured to supply electric power. The mounting bracket includes an arm-supporting portion rotatably supporting a cylindrical-end-portion side of the non-conductive arm. The connector is provided with an engaging protrusion at a position facing the arm-supporting portion of the connector. The non-conductive arm is provided with an annular projection formed on an outer peripheral surface of the cylindrical-end portion exposed outside the arm-supporting portion of the non-conductive arm and configured to engage with the engaging protrusion of the connector. The annular projection is provided with a cutout to guide the engaging protrusion of the connector.

The contact parts of the pair of conductors may be formed in an arcuate plate shape, and the pair of arcuate plate shape contact parts may be arranged via a gap on an outer peripheral surface of the cylindrical-end portion exposed outside the arm-supporting portion of the non-conductive arm. A recess for attaching the connector may be provided in the gap between the pair of arcuate plate shape contact parts on the outer peripheral surface of the cylindrical-end portion of the non-conductive arm. A spring-portion-displacing protrusion configured to lift the contact portion provided on a spring portion of the terminal wherein the spring portion elastically deforms may be provided on a lower position of the recess for attaching the connector wherein the recess is provided on the cylindrical-end portion of the non-conductive arm. The annular projection is provided at a lower position of the spring-portion-displacing protrusion of the cylindrical-end portion of the arm.

In the vehicle sun visor according to one aspect of the present invention, when a connector is assembled to a mounting bracket to which an arm is assembled, the connector cannot be assembled unless the cylindrical-end portion of the arm is in a correct assembling position, so that interference between the contact parts of a pair of conductors provided at the cylindrical-end portion of the arm and the respective spring portions having the contact portions of the pair of terminals of the connector is prevented. By preventing this interference, it is possible to reliably prevent each spring portion of the pair of terminals from deforming, and it is possible to reliably prevent conduction failure and resistance instability from occurring.

DETAILED DESCRIPTION

Figure 1:
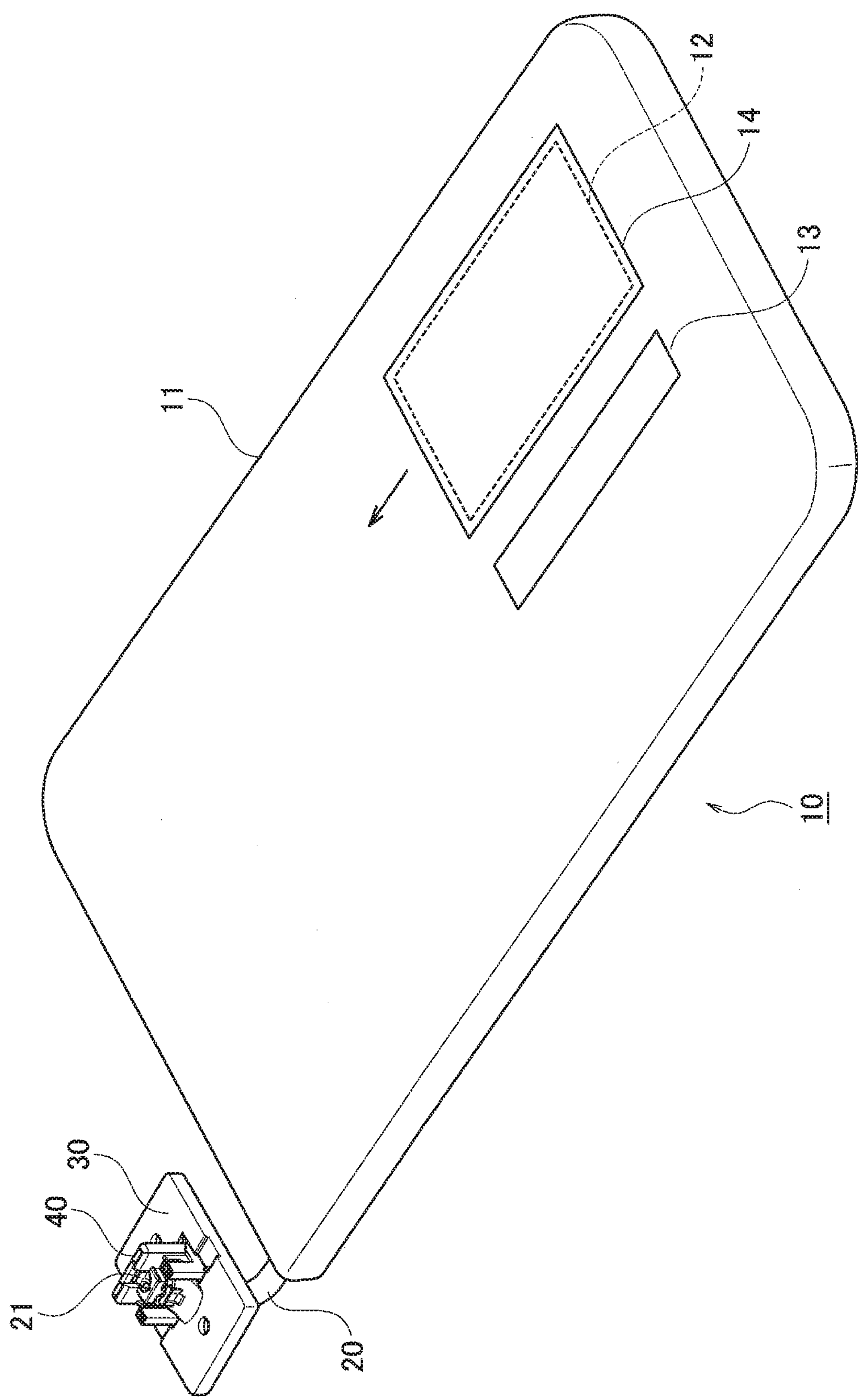
FIG. 1 is a perspective view of a vehicle sun visor according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
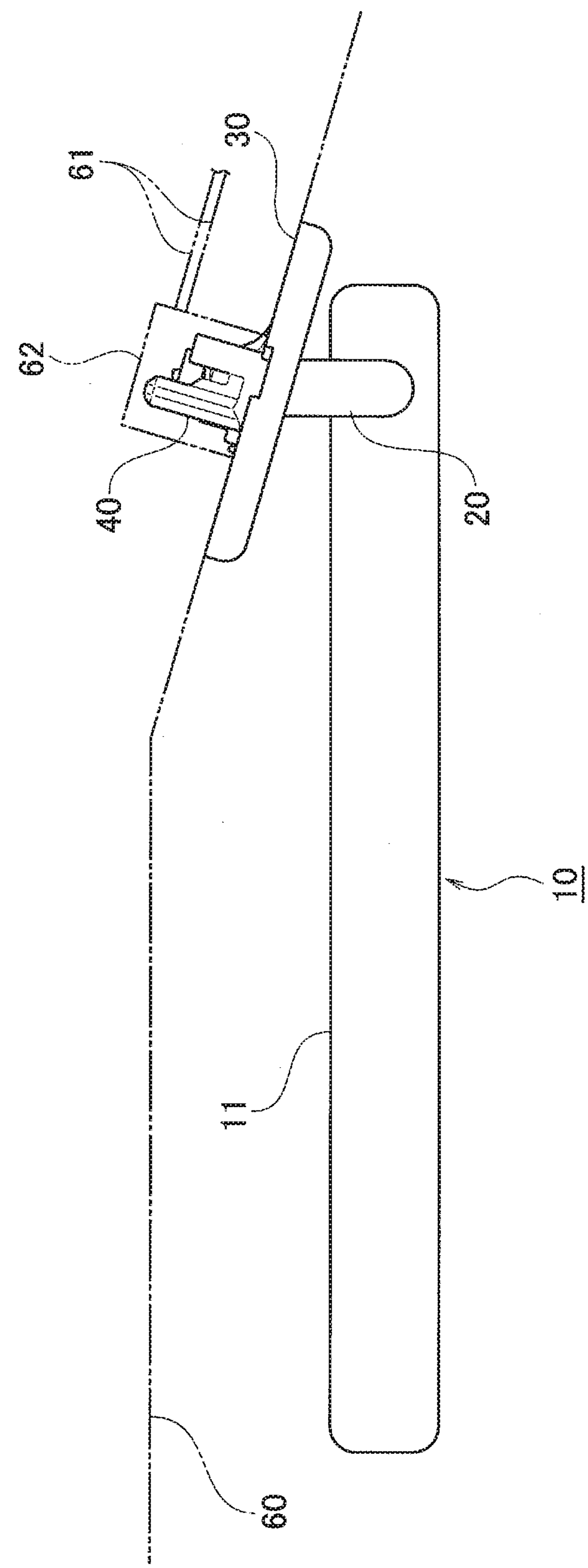
FIG. 2 is a side view showing a state in which the vehicle sun visor is stored toward a ceiling of a cabin.
Figure 3:
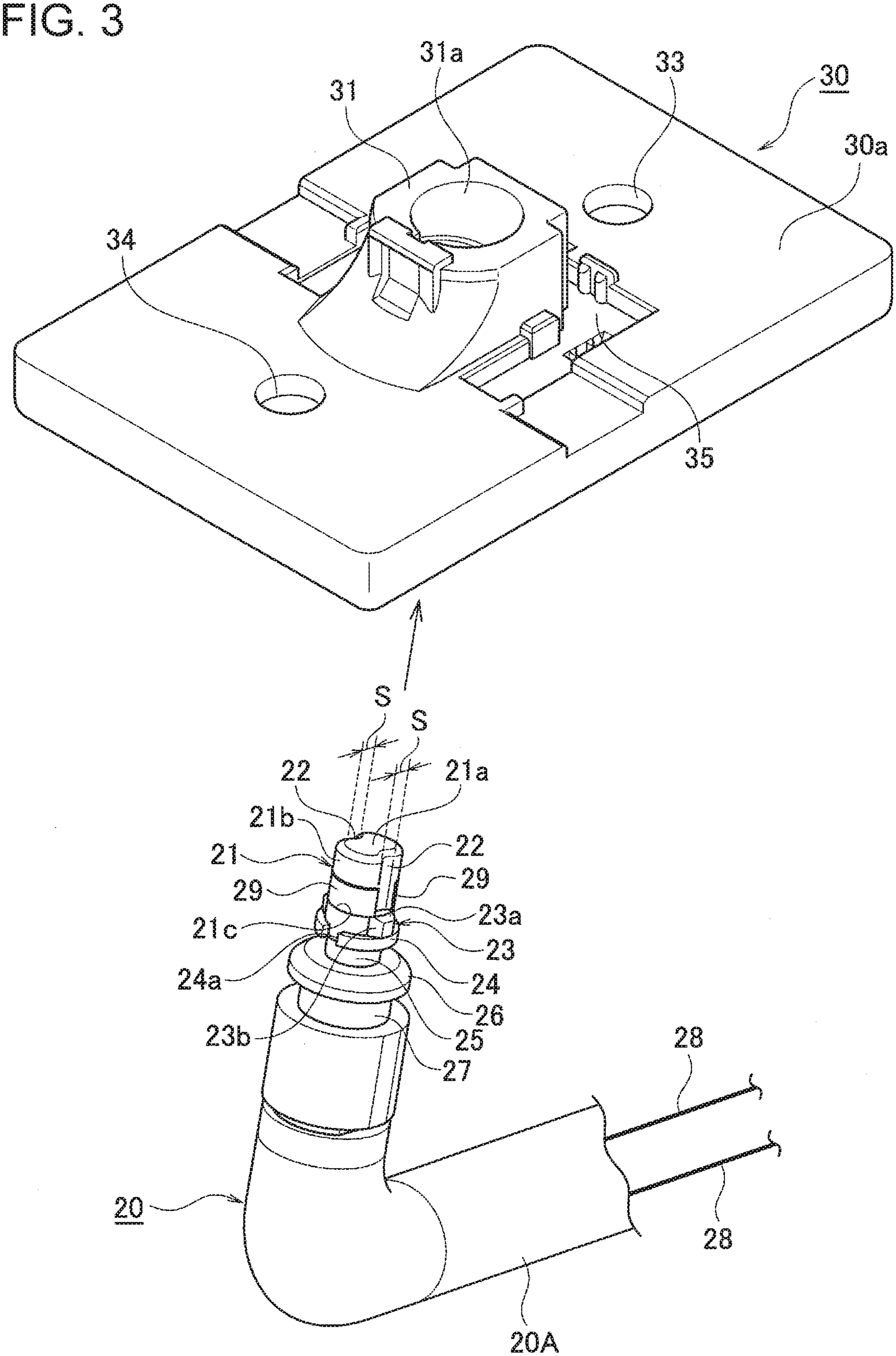
FIG. 3 is a perspective view showing a state before a cylindrical-end portion of an arm is press-fitted to a mounting bracket of the vehicle sun visor.
Figures 4A, 4B:
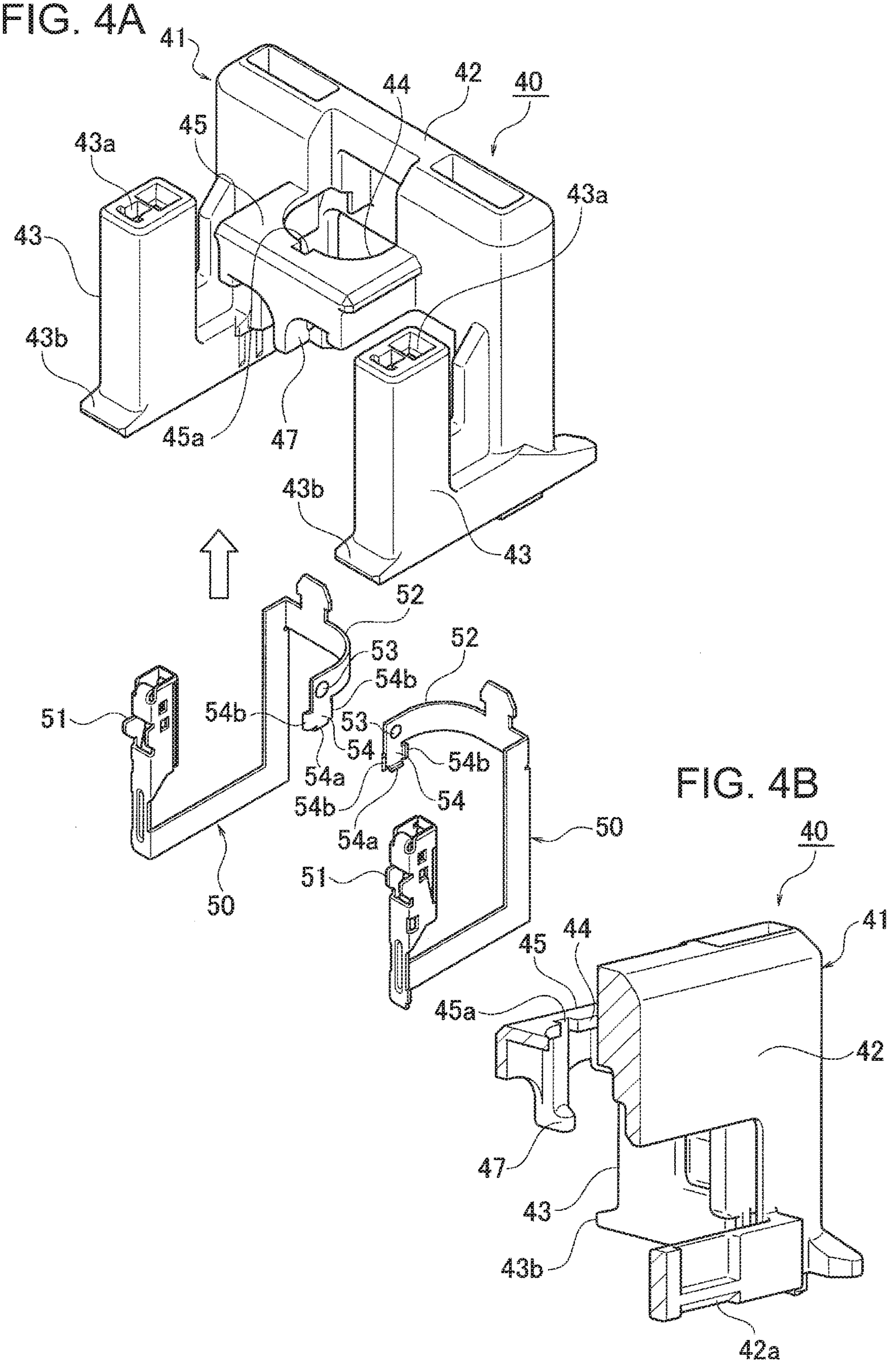
FIG. 4A is a perspective view showing a state before a pair of terminals are inserted into a connector of the vehicle sun visor.
FIG. 4B is a perspective view showing the connector, with a principal part in cross section.
Figure 5:
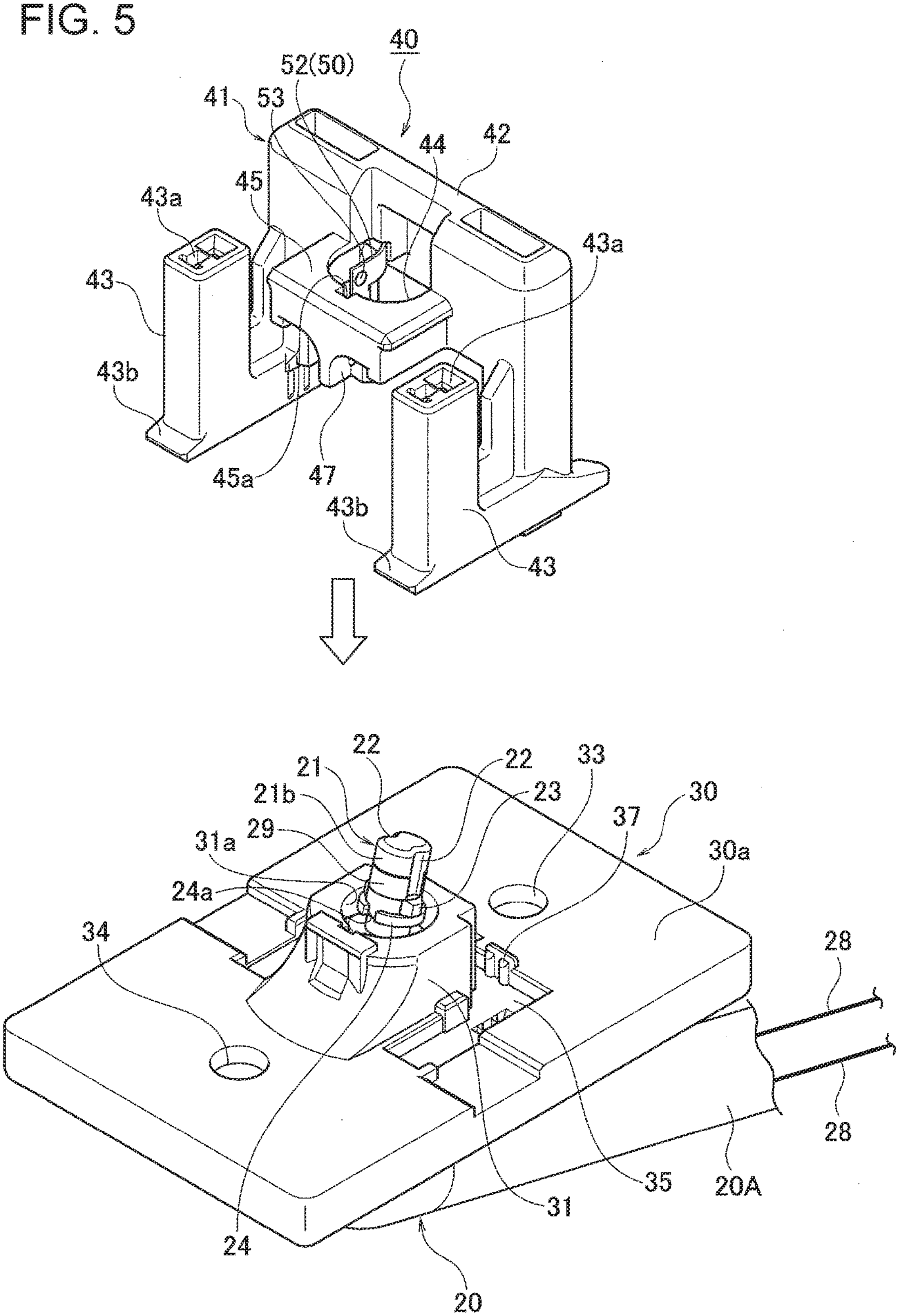
FIG. 5 is a perspective view showing a state before the connector is assembled to the mounting bracket to which the arm is attached.
Figure 6A:
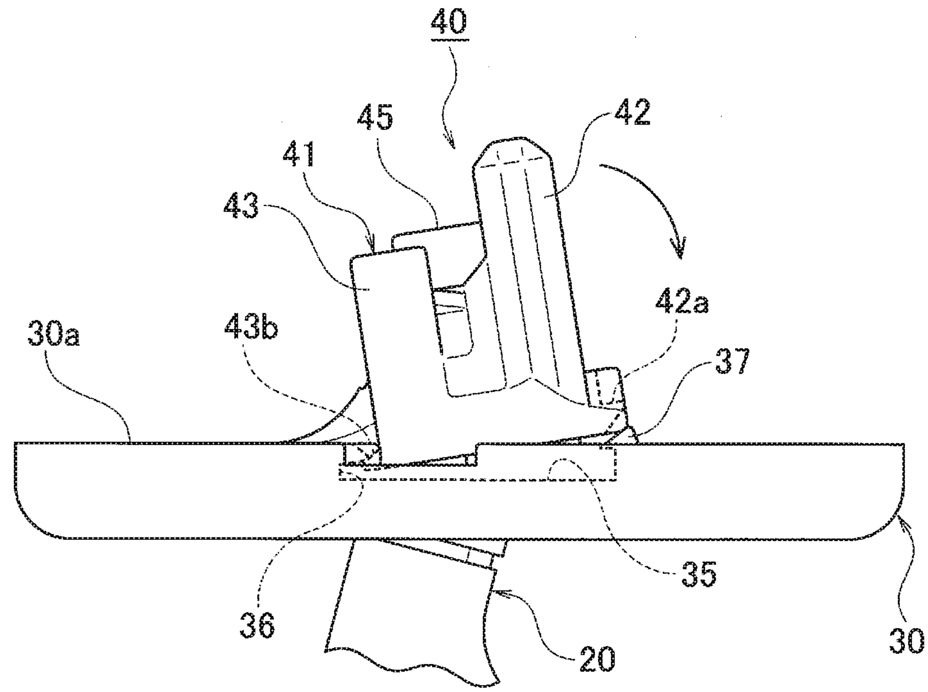
FIG. 6A is a side view showing a state in which the connector is being assembled to the mounting bracket.
Figure 6B:
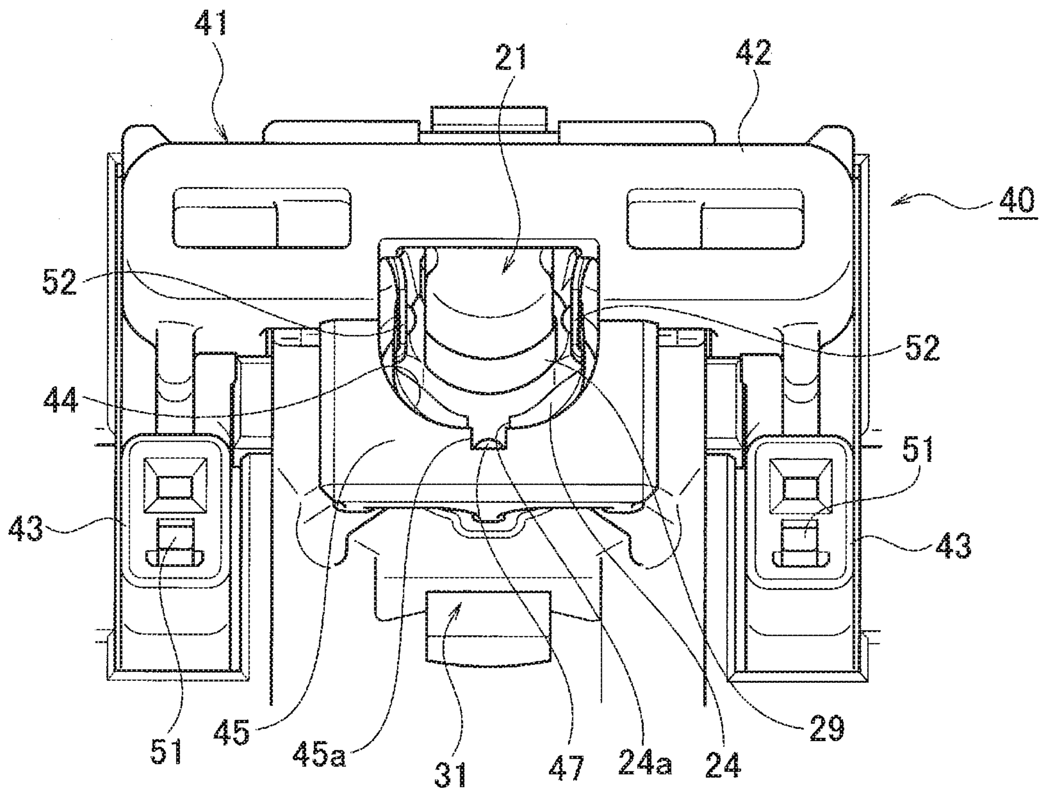
FIG. 6B is a plan view of the principal part in the state in which the connector is being assembled to the mounting bracket.
Figure 7A:
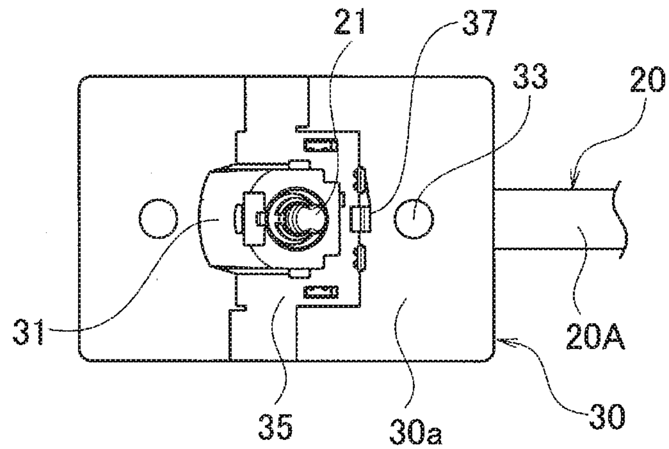
FIG. 7A is a plan view showing the positional relations between the mounting bracket and the arm when the connector is assembled.
Figure 7B:
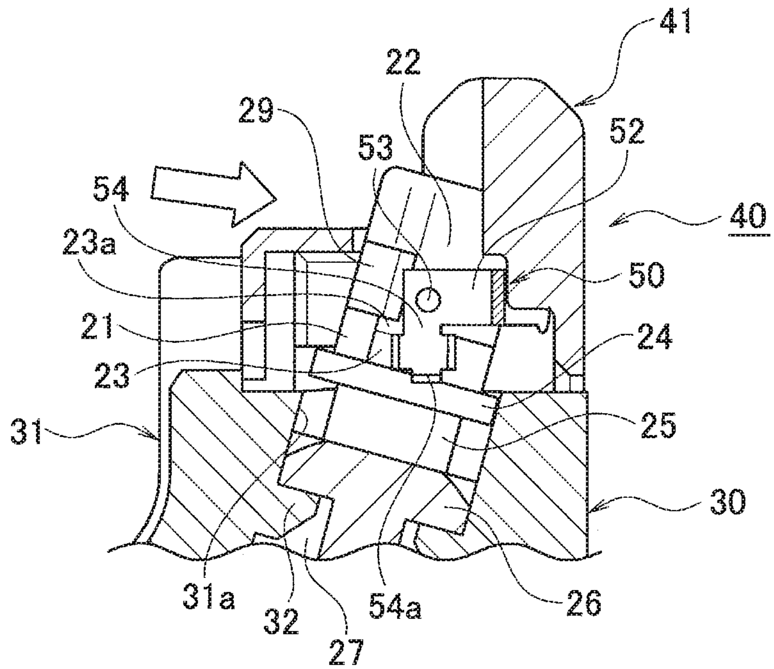
FIG. 7B is a cross-sectional view of a principal part in a state of assembling the connector to the mounting bracket.
Figure 7C:
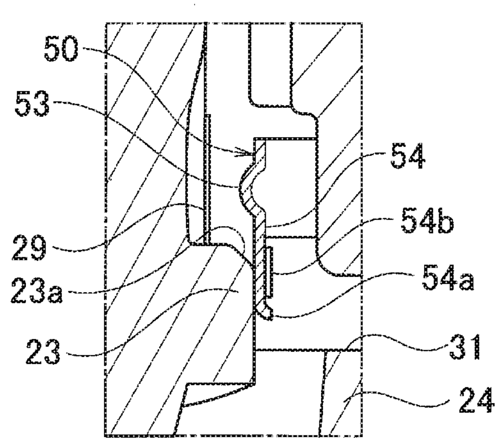
FIG. 7C is an enlarged cross-sectional view showing a periphery of a terminal contacting a protrusion for displacing a spring portion of the cylindrical-end portion in a state of assembling the connector to the mounting bracket.
Figure 8A:
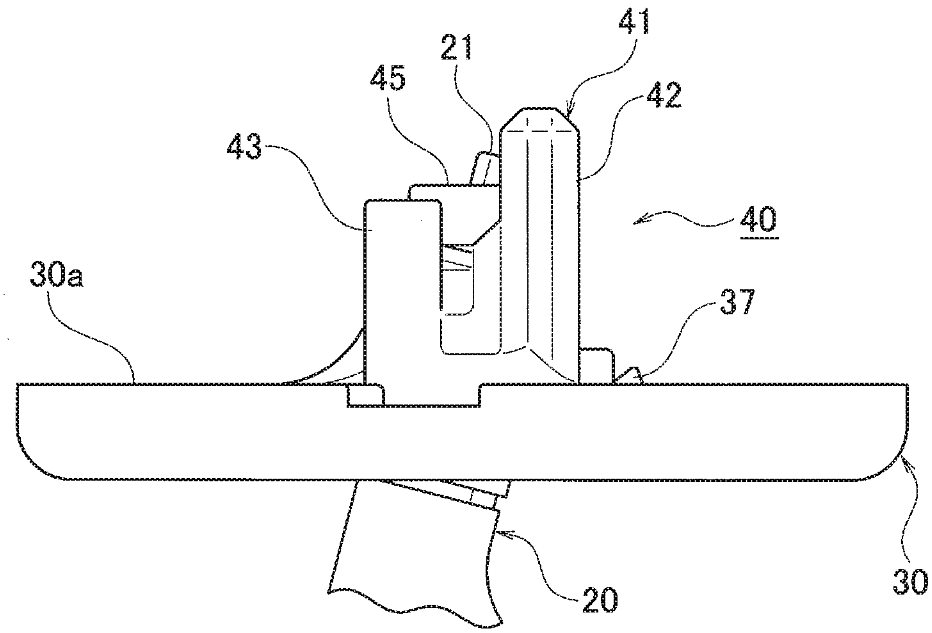
FIG. 8A is a side view showing a state in which the connector has been assembled to the mounting bracket.
Figure 8B:
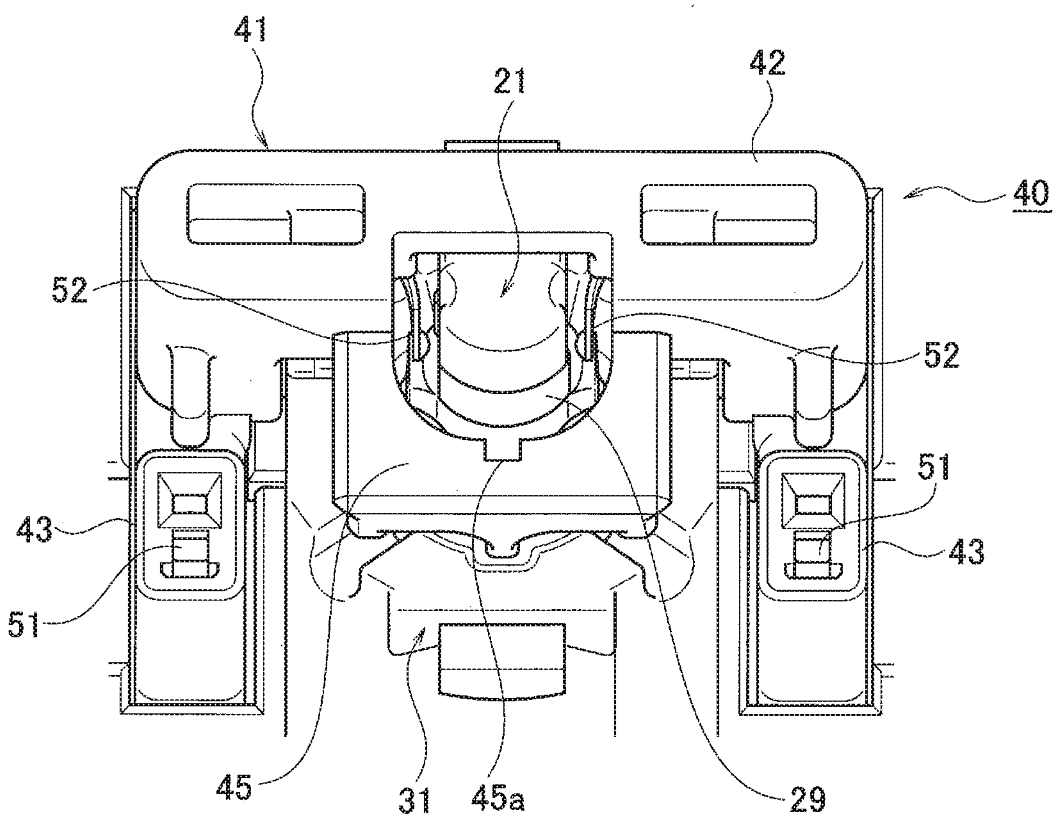
FIG. 8B is a plan view of the principal part in the state in which the connector has been assembled to the mounting bracket.
Figure 9:
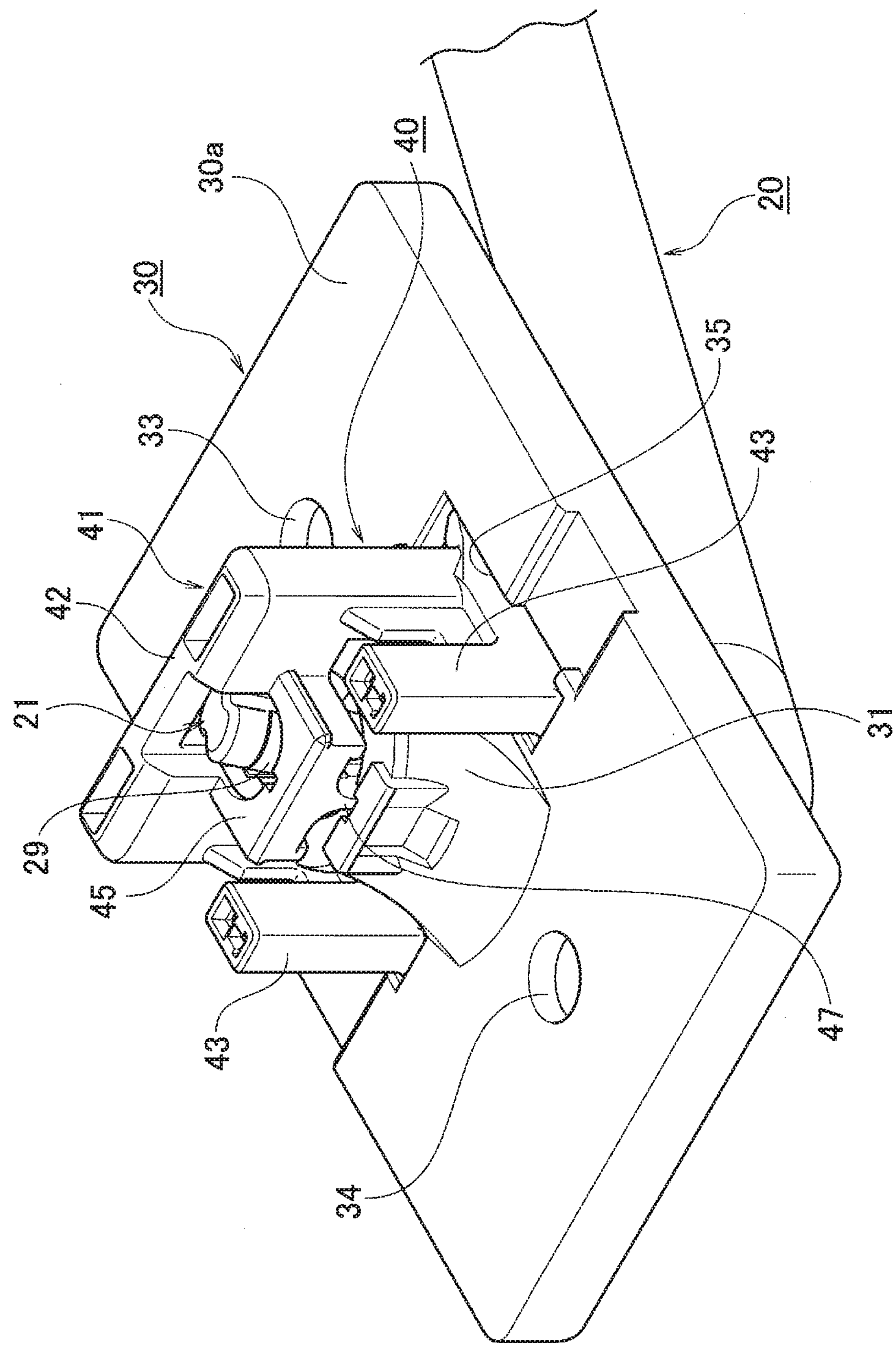
FIG. 9 is a perspective view showing a state in which the connector has been assembled to the mounting bracket.
Figure 10A:
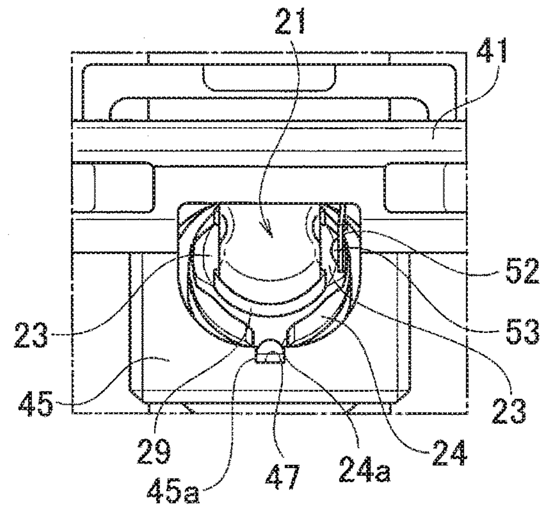
FIG. 10A is a plan view of a principal part in a state in which the connector has been assembled to the mounting bracket by regulating a position of the cylindrical-end portion of the arm.
Figure 10B:
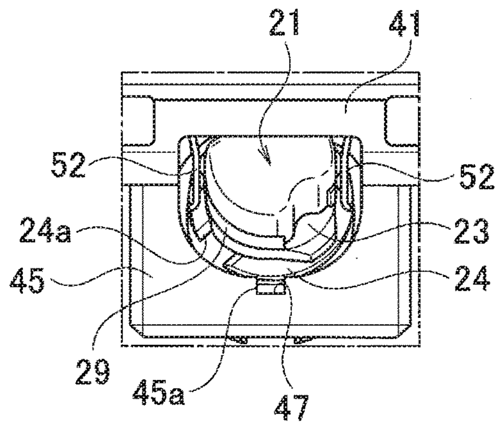
FIG. 10B is a plan view of an principal part showing a state in which the arm is rotated from the state in which the connector has been assembled to the mounting bracket by regulating the position of the cylindrical-end portion of the arm.
Figure 10C:
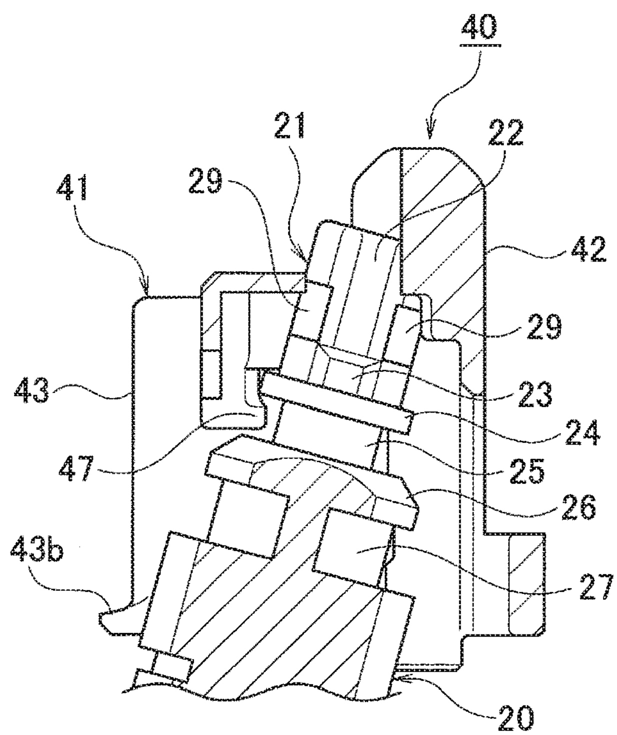
FIG. 10C is a cross-sectional view showing a state in which the connector has been assembled to the mounting bracket.
Figure 11A:
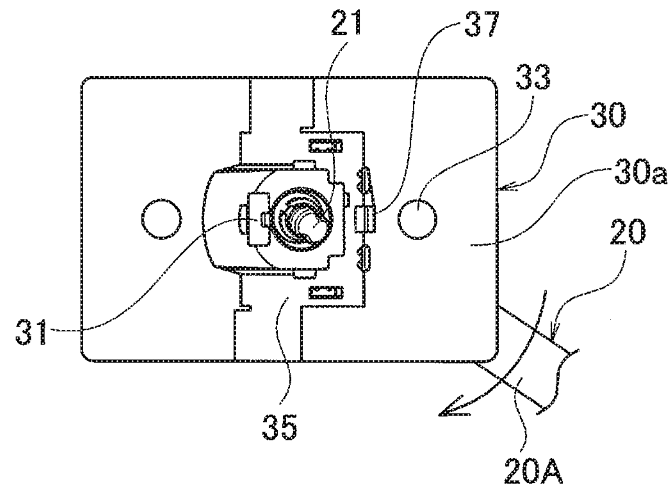
FIG. 11A is a plan view showing the positional relations between the mounting bracket and the arm when the arm is rotated after the connector has been assembled.
Figure 11B:
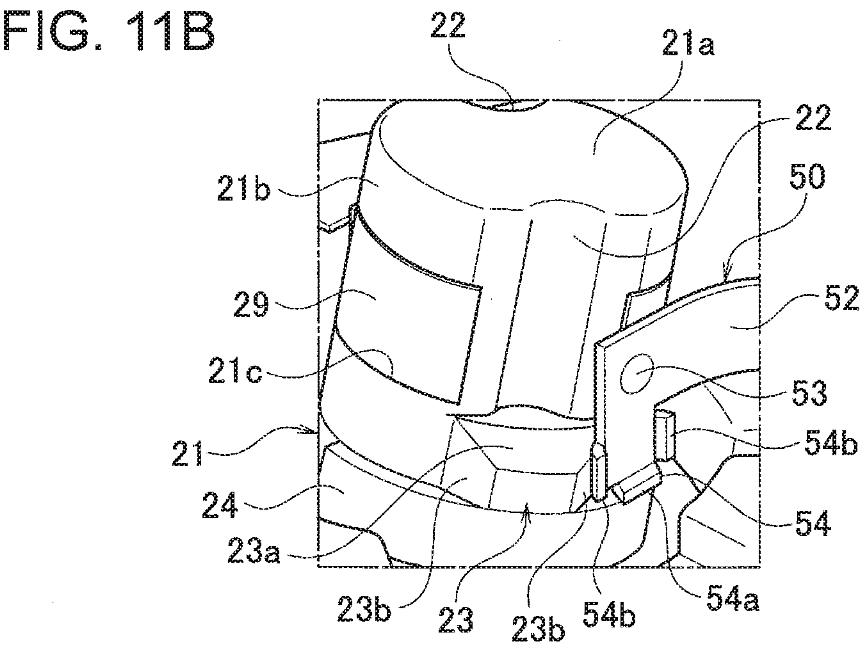
FIG. 11B is a perspective view of a principal part before a contact part provided on the terminal of the connector is lifted when the arm is rotated.
Figure 11C:
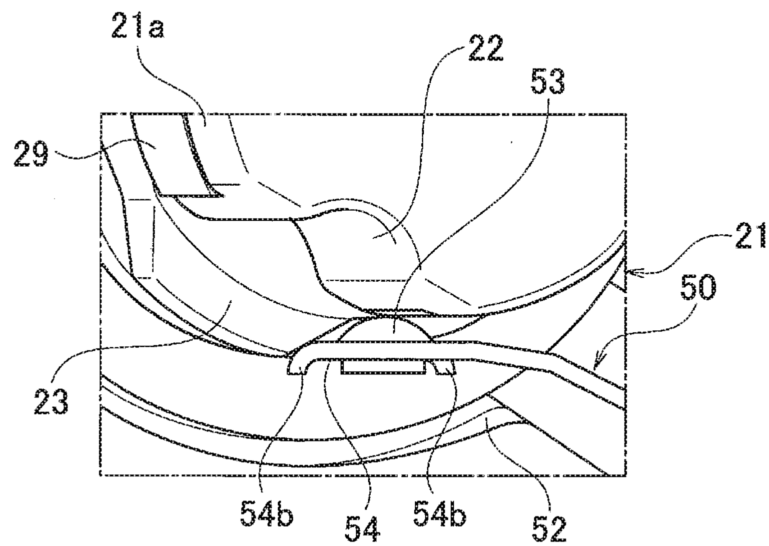
FIG. 11C is a perspective view as viewed from above of the principal part before a contact part provided on the terminal of the connector is lifted when the arm is rotated.
Figure 12:
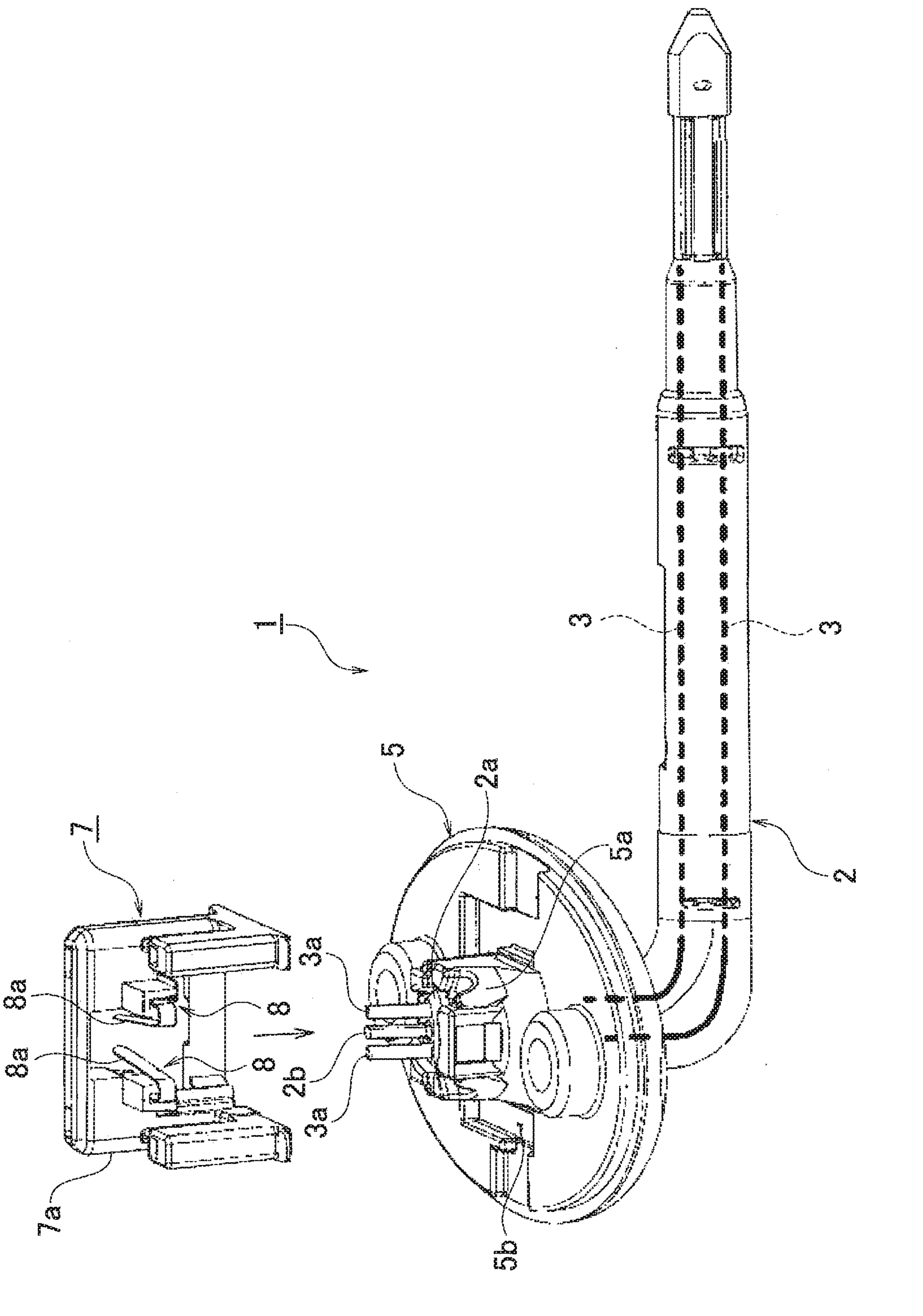
FIG. 12 is a perspective view showing a periphery of a mounting bracket of a conventional vehicle sun visor.

FIG. 1 is a perspective view of a vehicle sun visor according to one embodiment of the present invention, FIG. 2 is a side view showing a state in which the vehicle sun visor is stored on a ceiling of a cabin, FIG. 3 is a perspective view showing a state before the cylindrical end of an arm is press-fitted to a mounting bracket of the vehicle sun visor, FIG. 4A is a perspective view showing a state before a pair of terminals is inserted into the connector of the vehicle sun visor, FIG. 4B is a perspective view showing a principal part of the connector ross section, FIG. 5 is a perspective view showing a state before the connector is assembled to the mounting bracket to which the arm is attached, FIG. 6A is a side view showing a state in which the connector is being assembled to the mounting bracket, FIG. 6B is a plan view of the principal part in the state in which the connector is being assembled to the mounting bracket, FIG. 7A is a plan view showing the positional relationship between the mounting bracket and the arm when the connector is assembled, FIG. 7B is a cross-sectional view of a principal part in a state of assembling the connector to the mounting bracket, FIG. 7C is an enlarged cross-sectional view showing a periphery of a terminal contacting a protrusion for displacing a spring portion of the cylindrical-end portion, FIG. 8A is a side view showing a state in which the connector has been assembled to the mounting bracket, FIG. 8B is a plan view of the principal part in the state in which the connector has been assembled to the mounting bracket, FIG. 9 is a perspective view showing a state in which the connector has been assembled to the mounting bracket, FIG. 10A is a plan view of a principal part in a state in which the connector has been assembled to the mounting bracket by regulating a position of the cylindrical-end portion of the arm, FIG. 10B is a plan view of an principal part showing a state in which the arm is rotated from the state in which the connector has been assembled to the mounting bracket by regulating the position of the cylindrical-end portion of the arm, FIG. 10C is a cross-sectional view showing a state in which the connector has been assembled to the mounting bracket, FIG. 11A is a plan view showing the positional relations between the mounting bracket and the arm when the arm is rotated after the connector has been assembled, FIG. 11B is a perspective view of a principal part before the contact part provided on the terminal of the connector is lifted when the arm is rotated, and FIG. 11C is a perspective view as viewed from above of the principal part.

As shown in FIGS. 1 and 2, the vehicle sun visor 10 includes a sun visor body 11 having a vanity mirror (makeup mirror) 12 and an illumination lamp (electrical equipment) 13, a non-conductive arm 20 rotatably holding the sun visor body 11 and provided with each contact part 29 of a pair of conductors 28 and 28 at a cylindrical-end portion 21, a mounting bracket 30 for mounting the arm 20 to a roof trim (vehicle) 60, and a connector 40 detachably attached to the mounting bracket 30 and having a pair of terminals 50 and 50 for supplying electric power wherein the terminal has contact portion 53 being in contact with each contact part 29 of the pair of conductors 28 and 28.

As shown in FIGS. 3, 5, and 11A to 11C, the arm 20 is formed in a cylindrical shape with a synthetic resin. The arm 20 is formed so that the cylindrical-end portion 21 whose upper surface 21*a* is closed is inclined at a predetermined angle with respect to an arm body 20A. The pair of conductors 28 and 28 extending in parallel is routed inside the arm 20. Each contact part 29 of the pair of conductors 28 and 28 is formed in an arcuate plate shape wherein the contact part 29 is exposed toward the cylindrical-end portion 21 of the arm 20 and positioned at the cylindrical-end portion 21 (hereinafter referred to as "a pair of arcuate plate shape contact parts 29 and 29"). Further, an annular recessed groove portion 21*c* is formed at the center of a portion of the outer peripheral surface 21*b* of the cylindrical-end portion 21 of the arm 20 wherein the portion of the outer peripheral surface 21*b* is exposed outside an arm-supporting portion 31 of the mounting bracket 30, which will be described later. The pair of arcuate plate shape contact parts 29 and 29 positioned on the ends of the pair of conductors 28 and 28 is arranged with a predetermined gap S in the annular recessed groove portion 21*c*. This pair of gaps S and S is a non-contact region between the pair of arcuate plate shape contact parts 29 and 29 and each contact portion 53 of the pair of terminals 50 and 50.

As shown in FIGS. 3 and 11A to 11C, a groove portion (recess) 22 for connector assembling, which is arc recessed in section perpendicular to the axial direction, is formed to extend longitudinally along the axial direction in the gap S between the pair of arcuate plate shape contact parts 29 and 29 on the outer peripheral surface 21*b* of the cylindrical-end portion 21 of the arm 20. Further, on the lower side of the pair of arcuate recessed groove portions 22 and 22 of the outer peripheral surface 21*b* of the cylindrical-end portion 21 wherein the arcuate recessed groove portions 22 and 22 are provided for mounting the connector, a spring-portion-displacing protrusion 23 which lifts the contact portion 53 provided at the distal end of a spring portion 52 of the pair of terminals 50 and 50 for supplying electric power, wherein the spring portion 52 elastically deforms, integrally protrudes and is formed.

Further, as shown in FIG. 3 and FIGS. 7A to 7C, an annular flange portion (annular projection) 24 to be engaged with an engaging protrusion 47 (described later) for assembling the connector 40 is integrally protruded and formed on the lower side of the spring-portion-displacing protrusion 23 on the outer peripheral surface 21*b* of the cylindrical-end portion 21. Further, an annular recessed engagement groove (engagement portion) 25 is integrally formed on the lower side of the flange portion 24. A slit (cutout) 24*a* for guiding the engaging protrusion 47 of the connector 40 is formed in the annular flange portion 24. An annular flange portion 26 having a diameter larger than that of the flange portion 24 integrally protrudes and is formed on the lower side of the annular flange portion 24, and an annular recessed engagement groove (engaging portion) 27 are integrally formed on the lower side of the annular flange portion 26.

As shown in FIGS. 1 to 3 and FIGS. 5 to 9C, the mounting bracket 30 is made of a synthetic resin. A tubular arm-supporting portion 31 having a circular inner peripheral surface 31*a* rotatably supporting the cylindrical-end portion 21 of the arm 20 is integrally protruded and formed at the center of the mounting bracket 30. As shown in FIGS. 5 and 7B, the cylindrical-end portion 21 of the arm 20 is press-fitted to the inner peripheral surface 31*a* of the arm-supporting portion 31, and a locking protrusion (locking portion) 32 protruding from the inner peripheral surface 31*a* enters the annular recessed engagement groove 27 of the arm 20, and is engaged with the annular flange portion 26. Accordingly, the upper side of the cylindrical-end portion 21 of the rotating arm 20 protrudes outside the arm-supporting portion 31 such that the upper side is exposed.

As shown in FIG. 5, a recess 35 for assembling the connector is formed on both sides of the arm-supporting portion 31 on the upper surface 30*a* of the mounting bracket 30 and toward a mounting hole 33 of the mounting bracket 30. An engagement hole 36 into which a locking piece portion 43*b* of both side walls 43 and 43 of the connector 40 is fitted is formed on both sides of the recess 35 for assembling the connector toward a mounting hole 34, which is opposite the side of the mounting hole 33. In addition, as shown in FIGS. 5 and 6, a locking claw portion 37 to which the locking piece portion 42*a* of a housing body 42 of the connector 40 is locked is formed at the center of the recess 35 for assembling the connector toward the mounting hole 33. The mounting bracket 30 is screwed to a roof trim 60 by screws (not shown) via a pair of mounting holes 33 and 34.

As shown in FIGS. 4A and 4B, a housing 41 of the connector 40 is made of a synthetic resin. This housing 41 includes the housing body 42, a pair of side walls 43 and 43 having a L-shaped terminal receiving chamber 43*a* on both sides of the housing body 42, and a center wall 45 where a hollow portion 44 is formed between the center wall 45 and the center of the housing body 42. As shown in FIG. 5, when the housing 41 is assembled in the recess 35 for assembling the connector so that the pair of side walls 43 and 43 of the housing 41 is positioned on both sides of the arm-supporting portion 31 of the mounting bracket 30, as shown in FIG. 9, the cylindrical-end portion 21 of the arm 20 is exposed in the hollow portion 44 between the housing body 42 and the center wall 45.

In addition, as shown in FIGS. 4A to 6B, a rectangular cutout 45*a* is formed in the center of the center wall 45 of the connector 40 toward the hollow portion 44, and an engaging protrusion 47 for assembling is integrally formed on the lower side of the cutout 45*a*, that is, at a position facing the center of the arm-supporting portion 31. As shown in FIG. 10A, if the cylindrical-end portion 21 of the arm 20 is not positioned at the correct assembling position, it is impossible to attach the connector 40 to the mounting bracket 30. That is, the engaging protrusion 47 for assembling the housing 41 cannot enter the annular recessed engagement groove 25 of the arm 20 from the slit 24*a* of the annular flange portion 24. After assembling the connector 40 to the mounting bracket 30, as shown in FIGS. 1013 and 10C, the engaging protrusion 47 is engaged with the annular flange portion 24 by the rotation of the arm 20, so that the arm 20 is held by the housing 41. Note that, as shown in FIG. 7A, the correct assembling position of the cylindrical-end portion 21 of the arm 20 when the housing 41 of the connector 40 is assembled to the mounting bracket 30 is located such that the pair of arcuate recessed groove portions 22 and 22 of the cylindrical-end portion 21 of the aim 20 is positioned toward the pair of terminals 50 and 50 of the housing 41. That is, as shown in FIG. 7A, the arm body 20A of the arm 20 is located just below the mounting hole 33 of the mounting bracket 30.

As shown in FIGS. 4A and 4B, each terminal 50 whose distal end is a box-shaped terminal connection part 51 is formed in an L-shaped plate shape and housed in the L-shaped terminal receiving chamber 43*a* of the side wall 43 of the housing 41. In addition, the L-shaped plate spring portion 52 connected to the terminal connection part 51 of each terminal 50 is formed to be elastically deformable. In addition, the distal end of the spring portion 52 is provided with the semicircular spherical contact portion 53. Further, a guide portion 54 is provided at a position of the spring portion 52 of each terminal 50 wherein the position is faced with the spring-portion-displacing protrusion 23 formed on the cylindrical-end portion 21 of the arm 20. The guide portion 54 has a lower guide piece 54*a* for assembling the connector and a lateral guide piece 54*b* wherein the lateral guide piece 54*b* is composed of a pair of left and right lateral guide pieces 54*b* and 54*b* for rotating the arm.

As shown in FIG. 6B, each spring portion 52 and each guide portion 54 of the pair of terminals 50 and 50 are positioned in the hollow portion 44 between the housing body 42 and the center wall 45 of the housing 41. The spring portions 52 are arranged opposite to each other, and the guide portions 54 are arranged opposite to each other.

As shown in FIG. 2, the connector 40 is adapted to be fitted into a connector 62 connected to a power supply connection wire 61 toward the roof trim 60. At the time of this fitting, each terminal connection part 51 of the pair of terminals 50 and 50 of the connector 40 and the pair of terminals (not shown) of the connector 62 toward the roof trim 60 are electrically connected, and electric power is supplied to the pair of terminals 50 and 50 of the connector 40.

Further, as shown in FIG. 2, when the sun visor body 11 is stored toward the roof trim 60, and when the sun visor body 11 is folded down in front of the front window, the pair of arcuate plate shape contact parts 29 and 29 provided on the outer peripheral surface 21*b* of the cylindrical-end portion 21 is brought into contact. (conducting) with the contact portion 53 of each spring portion 52 of the pair of terminals 50 and 50 for supplying electric power to be in a conducting (ON) state. Then, the conductive circuit connecting the pair of conductors 28 and 28 routed in the arm 20 and the illumination lamp 13 of the sun visor body 11 is in a conducting state, whereby the lighting preparation state of the illumination lamp 13 of the sun visor body 11 is generated. In this lighting preparation state, when a cover (slide member) 14 covering a vanity mirror 12 of the sun visor body 11 is opened by sliding, the switch mechanism (not shown) is turned on, and the illumination lamp 13 is turned on. Further, when the sun visor body 11 is folded to the side of the side window, the pair of arcuate plate shape contact parts 29 and 29 provided on the outer peripheral surface 21*b* of the cylindrical-end portion 21 is away from the contact portion 53 of each spring portion 52 of the pair of terminals 50 and 50 for supplying electric power to be in a non-conducting state, so that the conductive circuit of the illumination lamp 13 is in a non-conducting (OFF) state.

According to the vehicle sun visor 10 of the embodiment as described above, when the vehicle sun visor 10 is assembled, first, as shown in FIG. 3, the cylindrical-end portion 21 of the arm 20 is press-fitted to a circular inner peripheral surface 31*a* formed obliquely in the arm-supporting portion 31 of the mounting bracket 30. By this press-fitting, as shown in FIG. 7B, the locking protrusion 32 protruding from the inner peripheral surface 31*a* of the arm-supporting portion 31 enters the annular recessed engagement groove 27 of the arm 20, and is engaged with the annular flange portion 26, and the cylindrical-end portion 21 of the arm 20 is rotatably supported on the arm-supporting portion 31.

Next, as shown in FIG. 4, after the pair of terminals 50 and 50 is inserted into the housing 41 of the connector 40, as shown in FIG. 5, the pair of arcuate recessed groove portions 22. and 22 for assembling the connector of the cylindrical-end portion 21 of the arm 20, wherein the pair of arcuate recessed groove portions 22 and 22 is exposed outside the arm-supporting portion 31 of the mounting bracket 30, is positioned to be faced with the both side walls 43 and 43 of the connector 40. In this state, as shown in FIGS. 6A and 6B, the pair of locking piece portions 43*b* and 43*b* provided on the both side walls 43 and 43 of the housing 41 of the connector 40 is inserted into the pair of engagement holes 36 and 36 provided in the recess 35 for assembling the connector wherein the recess is provided on the upper surface 30*a* of the mounting bracket 30, and the connector 40 is rotated to lock the locking piece portion 42*a* of the housing body 42 of the connector 40 to the locking claw portion 37 of the recess 35 for assembling the connector, as shown by the arrow in FIG. 6A, so that the connector 40 is attached to the upper surface 30*a* of the mounting bracket 30.

At this time, as shown in FIG. 7A, the arm body 20A of the arm 20 is located just below the mounting hole 33 of the mounting bracket 30, and as shown in FIGS. 7B and 7C, each contact portion 53 of the pair of terminals 50 and 50 assembled to the connector 40 passes the pair of arcuate recessed groove portions 22 and 22 on the outer peripheral surface 21*b* of the cylindrical-end portion 21 of the arm 20, and the connector 40 can be assembled to the mounting bracket 30 while each contact portion 53 does not contact the pair of arcuate plate shape contact parts 29 and 29 on the outer peripheral surface 21*b* of the cylindrical-end portion 21. The pair of arcuate plate shape contact parts 29 and 29 is provided so as to be flush with the outer peripheral surface 21*b* of the cylindrical-end portion 21.

When assembling the connector 40 to the mounting bracket 30, as shown in FIG. 10A, the cylindrical-end portion 21 of the arm 20 is located at a correct position for assembling. The engaging protrusion 47 for assembling the housing 41 enters the annular recessed engagement groove 25 from the slit 24*a* of the annular flange portion 24 of the cylindrical-end portion 21. Further, each contact portion 53 of the pair of terminals 50 and 50 of the connector 40 passes the pair of arcuate recessed groove portions 22 and 22 of the cylindrical-end portion 21. As a result, there is no interference between the pair of arcuate plate shape contact parts 29 and 29 and the contact portion 53 of each spring portion 52 of the pair of terminals 50 and 50, and the deformation of each spring portion 52 of the pair of terminals 50 and 50 can be reliably prevented. In this way, when assembling the connector 40 to the mounting bracket 30, if the cylindrical-end portion 21 of the arm 20 is not located at the correct assembling position, the connector 40 cannot be assembled to the mounting bracket 30, whereby deformation of the spring portion 52 of the terminal 50 due to the arcuate plate shape contact part 29 of the conductor 28 of the arm 20 can be reliably prevented, and it is possible to mass produce the high-quality vehicle sun visor 10. In addition, even when receiving an external force when transporting the vehicle sun visor 10 after production, the spring portion 52 of the terminal 50 is not deformed.

Further, as shown in FIGS. 7B and 7C, the lower guide piece 54*a* of each guide portion 54 of the pair of terminals 50 and 50 of the connector 40, wherein the lower guide piece 54*a* is provided for assembling the connector, rides on each slope 23*a* on the upper sides of the pair of spring-portion-displacing protrusions 23 and 23 formed on the cylindrical-end portion 21 of the arm 20, so that the contact portion 53 provided at the distal end of each spring portion 52 of the pair of terminals 50 and 50 can be lifted. According to this configuration, each contact portion 53 of the pair of terminals 50 and 50 of the connector 40 does not come into contact with the pair of arcuate plate shape contact parts 29 and 29 of the cylindrical-end portion 21 of the arm 20, and it is possible to protect the pair of terminals 50 and 50 without deforming each spring portion 52. By preventing each spring portion 52 of the pair of terminals 50 and 50 from deforming, it is possible to prevent conduction failure and resistance instability from occurring.

Further, as shown in FIG. 11A, even when the arm 20 rotates such that the arm body 20A of the arm 20 slightly rotates from a position just below the mounting hole 33 of the mounting bracket 30, as shown in FIGS. 11B and 11C, the lateral guide piece 54*b* for arm rotation of each guide portion 54 of the pair of terminals 50 and 50 rides on each slope 23*b* on the lateral side of the pair of protrusions 23 and 23 of the cylindrical-end portion 21 of the arm 20, so that the contact portion 53 of each spring portion 52 of the pair of terminals 50 and 50 can be lifted. As a result, each contact portion 53 of the pair of terminals 50 and 50 of the connector 40 does not come into contact with the pair of arcuate plate shape contact parts 29 and 29 of the cylindrical-end portion 21 of the arm 20, and it is possible to protect the pair of terminals 50 and 50 without deforming each spring portion 52. By preventing each spring portion 52 of the pair of terminals 50 and 50 from deforming, it is possible to prevent conduction failure and resistance instability from occurring.

When the arm 20 is rotated, as shown in FIGS. 10B and 10C, the engaging protrusion 47 of the housing 41 of the connector 40 is engaged with the annular flange portion 24 of the cylindrical-end portion 21 of the arm 20 by the rotation of the arm 20. As a result, the arm 20 is held by the housing 41 and the holding force is improved.

In the present embodiment, the pair of arcuate plate shape contact parts 29 and 29 is provided on the outer peripheral surface 21*b* of the cylindrical-end portion 21 of the arm 20 via a pair of gaps S and S, the pair of arcuate recessed groove portions 22 and 22 for mounting a connector is provided in the gaps S and S, and the spring-portion-displacing protrusion 23 which lifts each contact portion 53 of the pair of terminals 50 and 50 is provided under the pair of arcuate recessed groove portions 22 and 22. According to this configuration, the space between the respective spring portions 52 of the pair of terminals 50 and 50 can be made as narrowly as possible, the diameter of the connector 40 can be reduced, and the entire vehicle sun visor 10 can be downsized.

In addition, as shown in FIG. 3 and FIGS. 11A to 11C, in the present embodiment, on the lower side of the pair of arcuate recessed groove portions 22 and 22 of the outer peripheral surface 21*b* of the cylindrical-end portion 21 of the arm 20 wherein the arcuate recessed groove portions 22 and 22 are provided for mounting the connector, the spring-portion-displacing protrusion 23 which lifts the contact portion 53 provided at the distal end of the spring portion 52 of the pair of terminals 50 and 50 for supplying electric power, wherein the spring portion 52 elastically deforms, is provided, the guide portion 54 is provided at a position of each spring portion 52 of the pair of terminals 50 and 50 of the connector 40 wherein the position is faced with the spring-portion-displacing protrusion 23 formed on the cylindrical-end portion 21 of the arm 20, and each contact portion 53 of the pair of terminals 50 and 50 is away from the pair of arcuate plate shape contact parts 29 and 29 provided on the outer peripheral surface 21*b* of the cylindrical-end portion 21 of the arm 20 to be in a non-conducting state. According to this configuration, the pair of arcuate-plate-shape contact parts 29 and 29 of the cylindrical-end portion 1 of the arm 20 and each contact portion 53 of the pair of terminals 50 and 50 of the connector 40 can be reliably spaced away from each other.

According to the above embodiment, the sun visor body is provided with an illumination lamp as an electrical component. The sun visor body may be provided with a compact and thin liquid crystal monitor or the like as an electrical component.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiments of the present invention.

What is claimed is:

1. A vehicle sun visor comprising:

a sun visor body including an electrical component;

a non-conductive arm comprising a cylindrical-end portion on which contact parts of a pair of conductors are arranged and rotatably holding the sun visor body;

a mounting bracket configured to mount the non-conductive arm to a vehicle; and a connector detachably attached to the mounting bracket and including a pair of terminals each having a contact portion to contact with a corresponding contact part of the pair of conductors and configured to supply electric power, wherein the mounting bracket comprises an arm-supporting portion rotatably supporting a cylindrical-end-portion side of the non-conductive arm, the connector is provided with an engaging protrusion at a position facing the arm-supporting portion of the connector, and the non-conductive arm is provided with an annular projection formed on an outer peripheral surface of the cylindrical-end portion exposed outside the arm-supporting portion of the non-conductive arm and configured to engage with the engaging protrusion of the connector, and the annular projection is provided with a cutout to guide the engaging protrusion of the connector.

2. The vehicle sun visor according to claim 1, wherein the contact parts of the pair of conductors are formed in an arcuate plate shape, and the pair of arcuate plate shape contact parts is arranged via a gap on an outer peripheral surface of the cylindrical-end portion exposed outside the arm-supporting portion of the non-conductive arm, a recess for attaching the connector is provided in the gap between the pair of arcuate plate shape contact parts on the outer peripheral surface of the cylindrical-end portion of the non-conductive arm, a spring-portion-displacing protrusion configured to lift the contact portion provided on a spring portion of the terminal wherein the spring portion elastically deforms is provided on a lower position of the recess for attaching the connector wherein the recess is provided on the cylindrical-end portion of the non-conductive arm, and the annular projection is provided at a lower position of the spring-portion-displacing protrusion of the cylindrical-end portion of the arm.

* * * * *